June 18, 1929.  L. GOLDHAMMER  1,717,680
FILM CAMERA
Filed March 19, 1926
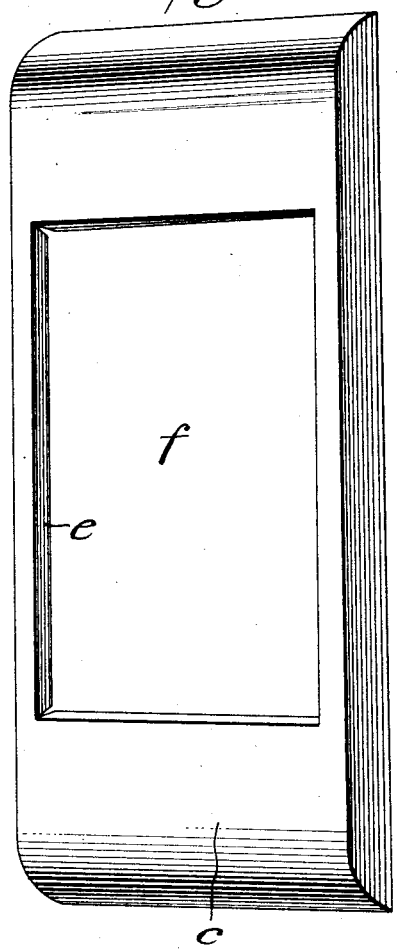
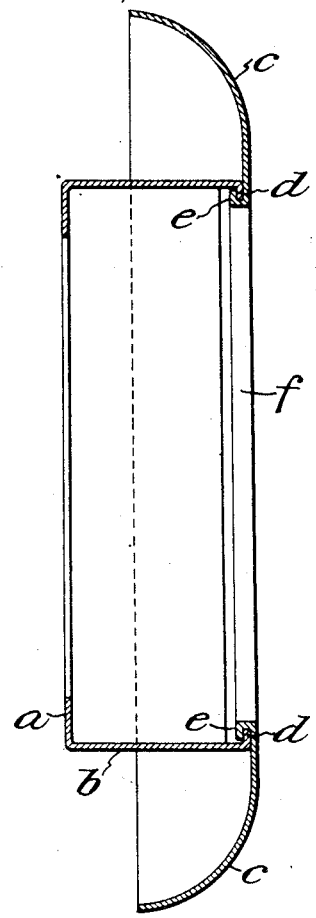
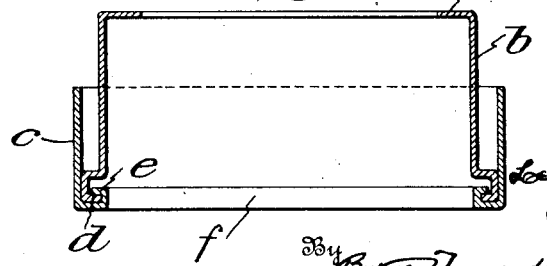

Patented June 18, 1929.

1,717,680

UNITED STATES PATENT OFFICE.

LEO GOLDHAMMER, OF MUNICH, GERMANY, ASSIGNOR, BY MESNE ASSIGNMENTS, TO AGFA ANSCO CORPORATION, OF BINGHAMTON, NEW YORK, A CORPORATION OF NEW YORK.

FILM CAMERA.

Application filed March 19, 1926, Serial No. 95,996, and in Germany April 11, 1925.

The present invention relates to film cameras, and more particularly to a constructural detail thereof.

The object of the invention and its characteristic features will appear from the description in connection with the accompanying drawings, in which Fig. 1 is a perspective view of a frame element forming part of the invention;

Fig. 2 is a vertical section of a construction embodying the invention; and

Fig. 3 is a transverse section of a construction representing a modification.

In the drawings, $a$ represents the interior casing of a film camera and $c$ part of the exterior casing defining the spool chambers.

Heretofore, the principal and usual modes of providing the interior casing and the exterior casing as a unitary structure were to either solder, weld or rivet them together or to integrally form them of one piece of metal as by drawing or by pressing.

By the process of soldering, welding or riveting, it is extremely difficult to produce a light-proof connection. By the process of drawing, it frequently happens that, due to the heavy strains upon the metal, the walls become in some places too thin or tear, which renders the construction useless. In either case, the assembly of the camera parts is impeded because of the difficulty of building the necessary parts into the interior casing since the latter is surrounded by the entire casing.

In contradistinction to the methods just referred to, I propose a connection which avoids all the difficulties mentioned.

Briefly expressed, the invention is carried out by a tongue and groove connection interconnecting the interior and the exterior casing. It is thereby immaterial which of the two provides the tongue and which the groove.

In the construction shown in Fig. 2, the marginal portion of the exterior casing, defining the opening $f$, is formed with flanges $e$ turned inwardly at right angle to the plane of the opening. The walls $b$ of the interior casing are turned inwardly at their free ends to define flanges $d$. The two casings may be readily united by turning the free portions of the flanges $e$ over the flanges $d$, an operation which is extremely simple. The flanges $d$ thus represent the tongues, and the turned-over flanges $e$ represent the grooves of the connection which, as can be readily seen affords a light-proof seal and a rigid mechanical union.

The construction shown in Fig. 3 is generally similar to that shown in Fig. 2. However, in addition to the tongue and groove connection defined by the flanges $d$ and $e$, the walls $b$ of the interior casing are expanded near their outer end adjoining the flanges $d$, into contact with the side walls of the interior casing $c$, thereby increasing the strength and rigidity of the connection and at the same time making the light seal doubly sure.

Aside from the simplicity and light-proof character of the construction described, the invention has the material advantage that the various parts to be housed within and upon the interior casing, may be built in before the two casings are interconnected and the connection may be effected without in any way disturbing these assembled parts.

I claim:

1. In a film camera, the combination of an interior casing, an exterior casing defining a spool chamber and having an opening for the interior casing, and means interconnecting the two casings adjacent the said opening, said means comprising a substantially continuous flange along the rim of the opening in said exterior casing, and a substantially continuous flange at the outer edges of the walls of the interior casing, one of said flanges being turned over and encompassing the other flange throughout the length thereof.

2. The structure as in claim 1 wherein two opposite walls of said interior casing are closely adjacent but spaced from two walls of the exterior casing, respectively, and are offset into engagement therewith adjacent the engaging flanges.

In testimony whereof, I affix my signature.

LEO GOLDHAMMER.